United States Patent
Gouman et al.

(10) Patent No.: US 7,918,922 B2
(45) Date of Patent: Apr. 5, 2011

(54) PROCESS FOR REMOVAL OF HYDROGEN SULPHIDE, IRON PENTACARBONYL AND NICKEL TETRACARBONYL FROM A SYNTHESIS GAS STREAM

(75) Inventors: Rudolf Robert Gouman, Amsterdam (NL); Adriaan Johannes Kodde, Amsterdam (NL); Cornelis Jacobus Smit, Amsterdam (NL)

(73) Assignee: Shell Oil Company, Houston, TX (US)

( * ) Notice: Subject to any disclaimer, the term of this patent is extended or adjusted under 35 U.S.C. 154(b) by 236 days.

(21) Appl. No.: 12/442,874

(22) PCT Filed: Sep. 26, 2007

(86) PCT No.: PCT/EP2007/060193
§ 371 (c)(1),
(2), (4) Date: Apr. 9, 2009

(87) PCT Pub. No.: WO2008/037728
PCT Pub. Date: Apr. 3, 2008

(65) Prior Publication Data
US 2010/0000407 A1    Jan. 7, 2010

(30) Foreign Application Priority Data
Sep. 27, 2006  (EP) .................................... 06121324

(51) Int. Cl.
*B01D 53/04*  (2006.01)
*B01D 53/14*  (2006.01)

(52) U.S. Cl. .................. 95/93; 95/133; 95/234; 95/235; 423/228

(58) Field of Classification Search ............... 95/92, 93, 95/133, 141, 234, 235, 237; 96/134, 243, 96/355; 423/226, 228, 229; 585/800, 820, 585/833
See application file for complete search history.

(56) References Cited

U.S. PATENT DOCUMENTS

| 3,086,340 | A |   | 4/1963  | Schmeckenbecher |
|-----------|---|---|---------|-----------------|
| 3,688,474 | A | * | 9/1972  | Head et al. ...................... 95/193 |
| 4,202,167 | A |   | 5/1980  | Suggitt et al. ................. 60/39.02 |
| 4,740,361 | A | * | 4/1988  | Heyd et al. ..................... 423/210 |
| 5,451,384 | A | * | 9/1995  | Carr ............................. 423/210 |
| 6,165,428 | A | * | 12/2000 | Eijkhoudt et al. ............. 423/210 |
| 7,569,096 | B2| * | 8/2009  | Ravikumar ...................... 95/133 |
| 7,597,743 | B2| * | 10/2009 | Ravikumar ...................... 95/133 |

FOREIGN PATENT DOCUMENTS

| DE | 106409  | 6/1974  |
| DE | 3148519 | 7/1983  |
| DE | 3941766 | 6/1991  |
| DE | 4031696 | 4/1992  |
| DE | 4401575 | 7/1995  |
| EP | 571820  | 12/1993 |

OTHER PUBLICATIONS

Frazier J: How's the sulfinol process working?, Hydrocarbon Processing, Gulf Publishing Co., Houston, TX, USA, vol. 49, No. 4, Apr. 1970, pp. 101-102.
Golden et al: Removal of Trace Iron and Nickel Carbonyls by Adsorption, Industrial & Engineering Chemistry Research, ACS, vol. 30, 1991, pp. 502-507.
Kohl A et al: Gas Purification, Gas Purification, 1985, pp. 867-871.
Taylor N A et al: Gas-desulfurization plant handles wide range of sour gas compositions, Oil and Gas Jrnl., Aug. 19, 1991, pp. 57-59.

* cited by examiner

*Primary Examiner* — Frank M Lawrence
(74) *Attorney, Agent, or Firm* — Charles W. Stewart

(57) ABSTRACT

The invention provides a process for removal of hydrogen sulphide, iron pentacarbonyl and nickel tetracarbonyl from a feed synthesis gas stream, the process comprising the steps of: (a) removal of hydrogen sulphide and of iron pentacarbonyl by contacting the feed synthesis gas stream with an absorbing liquid comprising water, physical solvent and an amine, to obtain a synthesis gas stream depleted of hydrogen sulphide and depleted of iron pentacarbonyl; (b) adsorption of nickel tetracarbonyl by contacting the synthesis gas stream depleted of hydrogen sulphide and depleted of iron pentacarbonyl with solid adsorbent comprising activated carbon to obtain solid adsorbent enriched in nickel tetracarbonyl and a purified synthesis gas stream.

9 Claims, No Drawings

PROCESS FOR REMOVAL OF HYDROGEN SULPHIDE, IRON PENTACARBONYL AND NICKEL TETRACARBONYL FROM A SYNTHESIS GAS STREAM

The present application claims priority from European Patent Application 06121324.5 filed 27 Sep. 2006.

The invention relates to a process for removal of hydrogen sulphide, iron pentacarbonyl and nickel tetracarbonyl from a synthesis gas stream.

Synthesis gas streams are gaseous streams mainly comprising carbon monoxide and hydrogen and further usually containing carbon dioxide, while also nitrogen, nitrogen-containing components (such as HCN and $NH_3$), metal carbonyls and steam may be present, as well as hydrogen sulphide and some other minor constituents for example carbonyl sulphide and carbonyl disulphide.

Synthesis gas streams may be produced via partial oxidation or steam reforming of hydrocarbons including natural gas, distillate oils and residual oil, and by gasification of coal or coke. During the production of synthesis gas, not only carbon monoxide and hydrogen are formed but also contaminants such as hydrogen sulphide and, albeit in smaller quantities, carbonyl compounds of nickel and iron. Under conditions prevailing in gasification plants carbon monoxide can react with iron and nickel surfaces and/or with iron and nickel present in the hydrocarbonaceous feedstock to give the corresponding metal carbonyls. Iron pentacarbonyl is often formed by the reaction of carbon monoxide with steel materials in the process equipment. Metal carbonyls can also be formed when gases are transported or stored in metal containers.

Synthesis gas streams are used in many ways in industrial processes. For example, synthesis gas streams can be used for the generation of electricity via a gas turbine fired on synthesis gas. Removal of sulphur compounds is required to prevent or reduce emission of SOx and meet environmental specifications. Another use of synthesis gas streams is for the production of hydrogen via the so-called water gas shift reaction.

Metal carbonyls, in particular nickel tetracarbonyl and iron pentacarbonyl, in combination with hydrogen sulphide, are prone to thermal and/or chemical decomposition to metal sulphides. Metal sulphide particles can cause fouling by deposition, encrusting or baking onto surfaces of process equipment, for example on trays of separating columns and/or on surfaces of liquid passages so that these passages can be blocked. Deposition of metal sulphide particles can lead to the process equipment being rendered inoperative in whole or in part.

Therefore, removal of nickel tetracarbonyl, iron pentacarbonyl and of hydrogen sulphide to low levels is required. Given the fact that during normal operation of a gasification plant several tons of iron pentacarbonyl and nickel tetracarbonyl per year are produced, the metal carbonyl problem is a sizeable one.

Processes for removal of hydrogen sulphide and metal carbonyls from a synthesis gas stream are known in the art.

For example, in DE 26 10 982 a process is described wherein a synthesis gas stream comprising contaminants is contacted with washing liquid, thereby transferring contaminants from the synthesis gas stream to the washing liquid. The loaded washing liquid is subsequently regenerated. However, the process described in DE 26 10 982 enables removal of about 20-96% of metal carbonyls, as can be deduced from FIG. 2. Thus, the process still results in a synthesis gas stream with a considerable amount of metal carbonyls. Moreover, the process is operated at subambient temperatures, requiring extensive refrigeration facilities.

In DE 43 36 790 a process is described wherein the synthesis gas stream is contacted with methanol as washing liquid. A highly loaded washing liquid and a poorly loaded washing liquid are heated and fed to a reactor. This process also does not result in a sufficiently high removal of metal carbonyls. In addition, the process is also performed at low temperatures requiring operated at subambient temperatures, requiring extensive refrigeration facilities.

The processes described in DE 26 10 982 and DE 43 36 790 both suffer from the presence of metal sulphide particles, resulting in plugging of the equipment. This indicates that the removal of metal carbonyls and of hydrogen sulphide is insufficient.

In U.S. Pat. No. 6,165,428 a process for the removal of metal carbonyl from gaseous streams in the presence of hydrogen sulphide and/or water is described. In the process described in U.S. Pat. No. 6,165,428, a synthesis gas stream containing metal carbonyls, water and/or hydrogen sulphide is contacted with a hydrophobic porous adsorbent having an accessible pore volume for pore sizes between 0.55 and 4 nm of at least 0.005 ml/g. The hydrophobic adsorbent is said to be preferably a Si and/or Al containing zeolite. The process is preferably used prior to passing the synthesis gas to a process unit for the removal of hydrogen sulphide and/or carbon dioxide. The examples of U.S. Pat. No. 6,165,428 show that the combination of pore size and hydrophobicity is essential. Thus, a relatively expensive adsorbent is needed.

It has now been found that removal of hydrogen sulphide, iron pentacarbonyl and nickel tetracarbonyl from a synthesis gas stream can be achieved via a process comprising two consecutive steps, wherein in the first step hydrogen sulphide and a large part, preferably all of the iron pentacarbonyl is removed, and in the second step removal of especially nickel tetracarbonyl takes place using an inexpensive and easily obtainable adsorbent.

Thus, the invention provides a process for removal of hydrogen sulphide, iron pentacarbonyl and nickel tetracarbonyl from a feed synthesis gas stream comprising hydrogen sulphide, iron pentacarbonyl, and nickel tetracarbonyl, the process comprising the steps of:

(a) removal of hydrogen sulphide and of iron pentacarbonyl from the feed synthesis gas stream by contacting the feed synthesis gas stream with an absorbing liquid comprising water, physical solvent and an amine, to obtain a synthesis gas stream depleted of hydrogen sulphide and depleted of iron pentacarbonyl;

(b) adsorption of nickel tetracarbonyl by contacting the synthesis gas stream depleted of hydrogen sulphide and depleted of iron pentacarbonyl with a solid adsorbent comprising activated carbon to obtain a solid adsorbent enriched in nickel tetracarbonyl and a purified synthesis gas stream.

It has been found that the absorbing liquid comprising water, physical solvent and an amine has a preferred affinity for iron pentacarbonyl compared to nickel tetracarbonyl. This enables removal of hydrogen sulphide as well as iron pentacarbonyl and enables removal of nickel tetracarbonyl using activated carbon, an inexpensive and easily available sorbent.

The process enables removal of iron pentacarbonyl and nickel tetracarbonyl to levels below 1 ppmv, or even below 0.1 ppmv. Even removal of nickel tetracarbonyl, which is considered to be more difficult than for example removal of iron pentacarbonyl, is possible to levels below 1 ppmv. Further, the process can be operated without the need for extensive refrigeration facilities.

The main constituents of synthesis gas are carbon monoxide and hydrogen. Synthesis gas can be prepared in a synthesis gas generation unit, for example high temperature reformers, autothermal reformers or gasifiers using coal, oil residue or natural gas as feedstock. Reference is made to Maarten van der Burgt et al., in "The Shell Middle Distillate Synthesis Process, Petroleum Review Apr. 1990 pp. 204-209" for a general description on the preparation of synthesis gas. Depending on the feedstock used to generate synthesis gas, contaminants such as hydrogen sulphide, carbonyl sulphide, hydrogen cyanide and to a lesser extent carbonyl disulphide will be present in the synthesis gas exiting the synthesis gas generation unit. In addition, the conditions in the synthesis generation unit are usually such that metal carbonyls will be formed and these will also be present as contaminants in the synthesis gas exiting the synthesis gas generation unit.

In step (a), the feed synthesis gas stream is contacted with absorbing liquid comprising water, physical solvent and an amine.

Suitable amines are primary, secondary and/or tertiary amines, especially amines that are derived of ethanolamine, especially monoethanol amine (MEA), diethanolamine (DEA), triethanolamine (TEA), diisopropanolamine (DIPA) and methyldiethanolamine (MDEA) or mixtures thereof. A preferred amine is a secondary or tertiary amine, preferably an amine compound derived from ethanol amine, more especially DIPA, DEA, MMEA (monomethyl-ethanolamine), MDEA, or DEMEA (diethyl-monoethanolamine), preferably DIPA or MDEA.

The absorbing liquid may also comprise a so-called activator compound. The addition of an activator compound to the absorbing liquid system is believed to result in an improved removal of hydrogen sulphide and also of other acidic compounds such as carbon dioxide. Suitable activator compounds are piperazine, methyl-ethanolamine, or (2-aminoethyl)ethanolamine, especially piperazine.

Suitable physical solvents are sulfolane (cyclo-tetramethylenesulfone and its derivatives), aliphatic acid amides, N-methylpyrrolidone, N-alkylated pyrrolidones and the corresponding piperidones, methanol, ethanol and mixtures of dialkylethers of polyethylene glycols or mixtures thereof. The preferred physical solvent is sulfolane. It is believed that $H_2S$ is taken up in the physical solvent and thereby removed from the feed gas stream. An advantage of using absorption liquids comprising both an amine and a physical solvents is that they show good absorption capacity and good selectivity for $H_2S$ and for iron pentacarbonyl against moderate investment costs and operational costs. Another advantage is that absorption liquids comprising both an amine and a physical solvents perform well at high pressures, especially between 20 and 90 bara. Hence, in the case that the feed gas stream is pressurised, no depressurising step is needed. Yet another advantage is that the use of a combined physical/chemical absorbing liquid, rather than an aqueous chemical absorbing liquid only, also results in the possibility of flashing any carbon dioxide at relatively high pressures (i.e. between 5 and 15 bara). This reduces re-compression requirements, e.g. for re-injection.

A preferred absorbing liquid comprises water, sulfolane and a secondary or tertiary amine, preferably an amine compound derived from ethanol amine, more especially DIPA, DEA, MMEA (monomethyl-ethanolamine), MDEA, or DEMEA (diethyl-monoethanolamine), preferably DIPA or MDEA.

An especially preferred absorbing liquid comprises water in the range of from 20 to 45 parts by weight, sulfolane in the range of from 20 to 35 parts by weight and amine in the range of from 40 to 55 parts by weight, the amounts of water, sulfolane and amine together being 100 parts by weight. The preferred ranges result in minimal carbon dioxide removal, in addition to optimum removal of hydrogen sulphide and of iron pentacarbonyl.

Another preferred absorbing liquid comprises in the range of from 15 to 45 parts by weight, preferably from 15 to 40 parts by weight of water, from 15 to 40 parts by weight of sulfolane, from 30 to 60 parts by weight of a secondary or tertiary amine derived from ethanol amine, and from 0 to 15 wt %, preferably from 0.5 to 10 wt % of an activator compound, preferably piperazine, all parts by weight based on total absorbing liquid and the added amounts of water, sulfolane, amine and optionally activator together being 100 parts by weight. This preferred absorbing liquid enables removal of hydrogen sulphide and/or COS from a gas stream comprising these compounds. When compared with the same absorbing liquid without the addition of a primary or secondary amine compound, especially a secondary amine compound, one or more of the following advantages are obtained: the loading amount is higher, the solvent/gas ratio is lower, the design of the plant is smaller and the regeneration heat requirement is lower (resulting is less cooling capacity). When compared with an absorbing liquid comprising aqueous amines, especially DMEA and piperazine, the addition of sulfolane enables the production of a gas stream comprising carbon dioxide having intermediate pressures, e.g. pressures between 3 and 15 bara, preferably between 5 and 10 bara.

It is an advantage of the invention that step (a) can be adjusted to enable producing a gas stream depleted of hydrogen sulphide and of iron pentacarbonyl from feed gas streams further comprising other compounds, in particular selected from the group of carbonyl sulphide and carbonyl disulphide. The process offers a choice whether or not to remove compounds other than hydrogen sulphide and iron pentacarbonyl, for example carbonyl sulphide or carbonyl disulphide, from the feed gas stream. Hence, different compositions of the gas stream obtained in step (a) can be achieved, suitably by adjusting the choice of absorbing liquid in step (a).

Suitably, step (a) is carried out at a temperature in the range of from 15 to 90° C., preferably at a temperature of at least 20° C., more preferably from 25 to 80° C., still more preferably from 40 to 65° C., and even still more preferably at about 55° C. Step (a) is suitably carried out at a pressure in the range of from 15 to 90 bara, preferably from 20 to 80 bara, more preferably from 30 to 70 bara.

Step (a) is suitably carried out in a zone having from 5-80 contacting layers, such as valve trays, bubble cap trays, baffles and the like. Structured packing may also be applied. A suitable solvent/feed gas ratio is from 1.0 to 10 (w/w), preferably between 2 and 6.

The gas stream obtained in step (a) is depleted of $H_2S$ and or iron pentacarbonyl, meaning that the concentration of $H_2S$ and of iron pentacarbonyl in the gas stream obtained in step (a) is lower than the respective concentration of these compounds in the feed gas stream. It will be understood that the concentration of $H_2S$ and of iron pentacarbonyl in the gas stream obtained in step (a) depends on their respective concentrations in the feed gas stream. Suitably, the concentration of $H_2S$ in the gas stream obtained in step (a) is in the range of from 80% to 0.001%, preferably from 20% to 0.01%, more preferably from 10% to 0.01% of the $H_2S$ concentration in the feed gas stream. Suitably, the concentration of $H_2S$ in the gas stream obtained in step (a) is less than 1 ppmv, preferably less than 0.5 ppmv. Suitably, the concentration of iron pentacarbonyl in the gas stream obtained in step (a) is in less than 10 ppmv, preferably less than 5 ppmv and more preferably less than 1 ppmv, based on the total gas stream.

In step (a), loaded absorbing liquid comprising $H_2S$, iron pentacarbonyl and optionally other sulphur compounds such as carbonyl sulphide or carbonyl disulphide is obtained. Step (a) will usually be carried out as a continuous process, which process also comprises the regeneration of the loaded absorbing liquid. Therefore, preferably a regeneration step is included wherein loaded absorbing liquid is contacted with regeneration gas, thereby transferring at least part of the contaminants to the regeneration gas. Typically, regeneration takes place at relatively low pressure and high temperature. The regeneration is suitably carried out by heating in a regenerator at a relatively high temperature, suitably in the range of from 70 to 150° C. The heating is preferably carried out with steam or hot oil. Preferably, the temperature increase is done in a stepwise mode. Suitably, regeneration is carried out at a pressure in the range of from 1 to 2 bara.

After regeneration, regenerated absorbing liquid is obtained and a loaded regeneration gas stream loaded with contaminants such as hydrogen sulphide, iron pentacarbonyl and/or optionally carbon dioxide and carbonyl sulphide. Preferably, regenerated absorbing liquid is used again in step (a). Suitably the regenerated absorbing liquid is heat exchanged with loaded absorbing liquid to use the heat elsewhere. Suitably, the loaded regeneration gas stream in sent to a sulphur recovery unit, for example a Claus unit, to convert the sulphur contaminants to elemental sulphur.

Adsorption of nickel tetracarbonyls takes place by contacting the synthesis gas stream depleted of hydrogen sulphide and of iron pentacarbonyl with solid adsorbent comprising activated carbon.

Suitably, adsorption of metal carbonyls is performed at a pressure in the range of from 1 to 80 bara, preferably from 15 to 70 bara, more preferably from 20 to 60 bara.

Suitably, the adsorption is performed at relatively low temperature, preferably in the range of from 10 to 150° C., more preferably from 10 to 100° C., still more preferably from 20 to 50° C. At the preferred temperature ranges, the adsorption capacity of the solid adsorbent, especially for nickel tetracarbonyl, is higher.

Adsorption of nickel tetracarbonyl results in solid adsorbent enriched in nickel tetracarbonyl and a purified synthesis gas stream.

Desorption of nickel tetracarbonyl from the solid adsorbent enriched in nickel tetracarbonyl enriched in metal carbonyls with a CO-containing gas. It has been found that by using CO-containing gas, desorption of metal carbonyls can be effected. The additional advantage of using a CO-containing gas for desorption is that synthesis gas may be used, either partly or wholly, as CO-containing gas.

The CO-containing gas comprises at least 0.5 volume % CO. It has been found that CO-containing gases comprising less than 0.5 volume % CO, for example nitrogen or hydrogen of laboratory grade, comprising only trace amounts of CO, do not result in a sufficient desorption of nickel tetracarbonyls from the solid adsorbent. For desorption of nickel tetracarbonyl from hydrophobic zeolite adsorbent and/or from activated carbon preferably the CO-containing gas comprises in the range of from 1 to 100 volume % CO, more preferably from 5 to 100 volume % CO, based on the total CO-containing gas. At these preferred CO percentages a better desorption rate is achieved, resulting in faster desorption to achieve regenerated solid adsorbent that can be used again to remove metal carbonyls from a synthesis gas stream comprising metal carbonyls.

The temperature at which nickel tetracarbonyl desorption takes place is higher than the temperature at which nickel tetracarbonyl adsorption takes place. It has been found that the desorption can be done especially well when the temperature at which nickel tetracarbonyl desorption takes place is in the range of from from 5° C. to 170° C. higher, preferably from 20° C. to 110° C. higher than the temperature at which nickel tetracarbonyl adsorption takes place.

It has been found that desorption of nickel tetracarbonyl can be effected even at relatively low temperatures, suitably in the range of from 20 to 200° C., preferably from 50 to 160° C.

The desired desorption temperature can for example be achieved by heating up the desorption zone, either externally or internally. An efficient way is by using hot CO-containing gas. It will be understood that the temperature of the hot CO-containing gas is preferably higher than the desired temperature at which desorption should take place, so that loss of heat during heat transfer will still enable reaching the desired temperature. Thus, preferably the temperature of the CO-containing gas is in the range of from 60 to 210° C., more preferably from 60 to 170° C.

In a preferred embodiment, the solid adsorbent comprising activated carbon is contained in a solid adsorbent bed. It will be understood that embodiments with two or more adsorbent beds are also comprised in the invention. The use of two or more solid adsorbent beds enables a continuous process, as one or more adsorbent bed can be in adsorption mode, meaning that they are used for adsorbing metal carbonyls, while the other adsorbent beds can be in desorption mode, meaning that adsorbed metal carbonyls are desorbed.

The process results in a purified synthesis gas stream. Suitably, the purified synthesis gas stream comprises less than 1 ppmv of metal carbonyls, based on the total synthesis gas stream. The synthesis gas depleted of metal carbonyls produced in the process is particularly suitable for use as feedstock for a hydrogen plant or for use in a gas turbine fired on synthesis gas for generation of electricity. Therefore the present invention also relates to these respective uses.

In some instances, it can be desirable to have a regenerative process, including destruction of nickel carbonyls present in the regeneration gas. Thus, preferably the process further includes removal of metal carbonyls removed from the CO-containing gas enriched in metal carbonyls. The CO-containing gas stream enriched in metal carbonyls is much smaller that the synthesis gas stream. Thus, destroying metal carbonyls in the CO-containing gas enriched in metal carbonyls, even when involving heating/cooling or conditioning such as wetting and/or desulphurisation is much easier and more economical to accomplish compared to destruction of metal carbonyls from the synthesis gas stream. Destruction of metal carbonyls present in the regeneration gas may be done in various ways.

In a first embodiment metal carbonyls in the CO-containing gas enriched in metal carbonyls are destructed by contacting the CO-containing gas enriched in metal carbonyls with an oxidising agent, as for example described in U.S. Pat. No. 4,478,798, which patent is incorporated herein by reference. Preferably an oxidising agent selected from the group of $O_2$, $SO_2$, $N_2O$, $Cl_2$, $Br_2$, $I_2$, $O_3$ and $H_2O_2$ is used. The cheapest oxydising agent is an oxygen-containing gas, for example air or oxygen-enriched air or even pure oxygen. More vigorous gaseous oxidising agents such as $SO_2$, $N_2O$, $Cl_2$, $Br_2$, $I_2$ and $O_3$ can be also used. These compounds are more expensive and may give rise to additional operational and/or safety measures, but will result in a faster destruction of metal carbonyls. Alternativey, the CO-containing gas enriched in metal carbonyls can be contacted with an aqueous $H_2O_2$ solution, as for example described in EP 0,571,820. This is suitably done by introducing finely divided CO-containing gas enriched in metal carbonyls into an $H_2O_2$ solution. Thus, the contact area of the CO-containing gas enriched in metal carbonyls with the $H_2O_2$ is increased, leading to a better oxidation. Preferably, an aqueous $H_2O_2$ solution comprising from 0.5 to 15 wt %, more preferably from 1.0 to 10, most preferably from 1.5 to 5 wt % of $H_2O_2$, based on the total $H_2O_2$ solution, is used. These preferred $H_2O_2$ concentrations result in a better metal carbonyl destruction. After oxidation, the resulting metal oxides can easily be removed and disposed of.

In a second embodiment, metal carbonyls are removed from the CO-containing gas enriched in metal carbonyls by subjecting the CO-containing gas enriched in metal carbonyls to a water gas shift reaction, as for example described in U.S. Pat. No. 4,202,167 and in DE 3,941,766, which patents are incorporated herein by reference. The term "water gas shift reaction" refers to the conversion of CO and $H_2O$ to $H_2$ and $CO_2$, i.e. the catalytic reaction between carbon monoxide and water in which each molecule of carbon monoxide is replaced by a molecule of hydrogen according the following equation $CO+H_2O \rightarrow H_2+CO_2$. The water gas shift reaction raises the temperature of the CO-containing gas to above about 315° C. At this elevated temperature, metal carbonyls and especially nickel tetracarbonyls are destroyed.

In a third embodiment, metal carbonyls are removed from the CO-containing gas enriched in metal carbonyls by contacting the CO-containing gas enriched in metal carbonyls with solid adsorbent comprising a sulphide and/or an oxide, as for example described in EP 0,239,111, which patent is incorporated herein by reference. Zinc sulphide and/or zinc oxide are preferred. Suitably, the CO-containing gas enriched in metal carbonyls is contacted with solid adsorbent comprising zinc oxide and/or zinc sulphide for a period of time sufficient to reduce the metal carbonyl content. The solid adsorbent is then discarded.

In a fourth embodiment, metal carbonyls are removed from the CO-containing gas enriched in metal carbonyls by introducing the CO-containing gas enriched in metal carbonyls into a gasification unit. This embodiment is especially preferred when the synthesis gas is prepared via gasification of coal or coke in a gasification unit. Metal carbonyls can then simple be removed by directing the CO-containing gas enriched in metal carbonyls back to the same gasification unit where the synthesis gas stream comprising metal carbonyls originates from.

In a fifth embodiment, metal carbonyls are removed from the CO-containing gas enriched in metal carbonyls by heating the CO-containing gas enriched in metal carbonyls. Heating above a certain temperature results in the destruction of metal carbonyls. Preferably, the heating is done to a temperature above about 315° C. At a temperature above about 315° C., metal carbonyls and especially nickel tetracarbonyls are destroyed.

The invention will now be illustrated using the following non-limiting examples.

EXAMPLE 1

The removal of metal carbonyls in a liquid absorbent was studied. In a typical experiment, a synthesis gas mixture (50 v % CO, 50 v % $H_2$) comprising metal carbonyls was bubbled through different liquid absorbents at a pressure of 10 barg and a temperature of 30° C. in a glass flask that was contained within a steel high-pressure vessel.

At regular times liquid absorbent samples were taken for analysis. The samples were mixed with an iodine/butanol in order to ensure decomposition of the volatile metal carbonyls into their non-volatile metal components.

In addition, samples were taken from the off-gas exiting the glass flask by passing a measured volume of gas through two glass flasks that were placed in series and were encapsulated by a steel high-pressure vessel. These flasks were also filled with an iodine/butanol solution.

Organic and volatile components of the iodine/butanol samples were removed by destruction after which the metal content was determined employing ICP (Inductively Coupled Plasma emissions spectroscopy).

A mass balance over the absorber was made after 6 hours and the result is shown in Tables 1 and 2 below for two metal carbonyl concentration levels in the feed.

TABLE 1

Feed 136 mg/$Nm^3$ Fe(CO)$_5$ in synthesis gas

| Solvent | Fe (in) mg | Fe (abs) | Fe (out) | (abs + out)/in |
|---|---|---|---|---|
| 2.5 M DIPA | 17.5 | 1.6 | 17.2 | 108% |
| 3.0 M MDEA | 22.7 | 2.3 | 20.1 | 99% |
| Sulfinol-M(a) | 25.0 | 18.0 | 7.3 | 101% |

(a)Sulfinol-M is a mixture of 50/25/25 MDEA/sulfolane/water.

TABLE 2

Feed 25 mg/$Nm^3$ Fe(CO)$_5$ and 160 mg/$Nm^3$ Ni(CO)$_4$ in synthesis gas

| Solvent | Fe (in) mg | Fe (abs) mg | Fe (out) mg | (abs + out)/in |
|---|---|---|---|---|
| 2.5 M DIPA | 3.7 | 0.53 | 3.7 | 115% |
| 3.0 M MDEA | 4.3 | 0.5 | 4.2 | 108% |
| Sulfinol-M(a) | 3.0 | 2.3 | 0.5 | 94% |

| Solvent | Ni (in) mg | Ni (abs) mg | Ni (out) mg | (abs + out)/in |
|---|---|---|---|---|
| 2.5 M DIPA | 28.3 | — | 31.38 | 111% |
| 3.0 M MDEA | 33.4 | — | 34.0 | 102% |
| Sulfinol-M(a) | 23.2 | — | 25.62 | 111% |

(a)Sulfinol-M is a mixture of 50/25/25 MDEA/sulfolane/water.

At the time of the sampling, the gas phase and the solvent phase were not yet in chemical equilibrium. However, the behavior of metal carbonyls in the experiment described above is a clear indicator for the behavior of metal carbonyls in synthesis gas when brought into contact with the same solvent in a multi stage counter current absorber. A significant uptake of metal carbonyls in a single absorber stage as was demonstrated for Iron pentacarbonyl in Sulfinol-M sorbent in this example is a clear indicator for a highly effective removal of metal carbonyls in a multistage counter current absorber.

Example 1 illustrates that fully aqueous solvents, have a limited affinity for both Nickel tetracarbonyl and Iron pentacarbonyl. In contrast to the aqueous solvents, the Sulfinol formulation with both aqueous and physical solvents is an efficient solvent for the removal of Iron pentacarbonyls whereas it has little affinity for removing Nickel tetracarbonyls.

EXAMPLE 2

The ability to remove both $H_2S$ and Iron pentacarbonyl from synthesis gas is demonstrated in the following experiment.

The experimental set-up as used in example 1 was modified in such a manner that the metal carbonyl content of the synthesis gas mixture could be analyzed on-line using infrared spectroscopy. This methodology enabled the analysis of metal carbonyls in sour synthesis gas.

In each experiment the solvent was initially purged with nitrogen after which synthesis gas was bubbled through the solvent. Each experiment was continued until the metal carbonyl content as measured in the in- and out-going gas were equal, whereby it was ensured that an equilibrium was established between the metal carbonyl content in the gas phase and the vapour phase. The solubility of metal carbonyls in the solvent was calculated from the cumulative amount of metal carbonyls retained in the solvent. The results are shown in table 3.

The example illustrates that removal of $H_2S$ as well as Iron pentacarbonyl from a synthesis gas stream can be achieved using a Sulfinol-M mixture.

TABLE 3

| Solvent | Conditions | Feed composition | | | | Solubility | |
|---|---|---|---|---|---|---|---|
| | | CO % v | $H_2S$ % v | $Fe(CO)_5$ ppmv | $Ni(CO)_4$ ppmv | $Fe(CO)_5$ mg(Fe)/l | $Ni(CO)_4$ mg(Ni)/l |
| Sulfinol-M (50/25/25) | P = 28.1 bar T = 20.1° C. | 100 | — | 16.5 | 17.3 | >114 | <10 |
| Sulfinol-M (50/25/25) | P = 25.5 bar T = 23.3° C. | 84.3 | 1.1 | 24 | 30 | >239 | n.m. | n.m.: not measured

EXAMPLE 3

This example illustrates the ability of activated carbon to desorb nickel tetracarbonyls from a synthesis gas depleted of $H_2S$ and iron perntacarbonyl. Furthermore regeneration of the activated carbon by using synthesis gas under mild conditions is demonstrated.

This experiment consists of two consecutive steps:
Step I: Adsorption.
Step II Regeneration by CO-Containing Gas.

The experiment was conducted using in a micro-tubular reactor. The set-up consisted of (i) a high-pressure gas mixing system whereby a gas is sourced from certified stock mixtures, (ii) a pressure and temperature controlled tubular adsorber in which an accurately known quantity of crushed adsorbent of well defined size is uniformly placed and (iii) an analysis section whereby the composition of the in-going or out-going gas mixture can be analyzed by both gas chromatography and infrared analysis. The infrared analysis is used to determine the quantity of metal carbonyls in the gas stream and is based on the measurement of unique vibrations at 2057 $cm^{-1}$ for $Ni(CO)_4$ and 2012 $cm^{-1}$ and 2032 $cm^{-1}$ for $Fe(CO)_5$. The method permits the measurement of metal carbonyls in sour synthesis gas.

An accurately known quantity of activated carbon was placed in the adsorber. The reactor was flushed with nitrogen and residual adsorbates where removed by first heating up to 150° C. and subsequently cooling down with flowing synthesis gas comprising CO (40 v %, $H_2$ 50 v % and $N_2$ 10 v %). The absorber conditions were equilibrated at 45° C. and 55 bara.
Step I: Adsorption.

Next, 5 ppmv $Ni(CO)_4$ was added to the mixture employing a certified gas cylinder containing a mixture of nickel tetracarbonyl in CO and the resulting mixture was contacted with the activated carbon adsorbent. Removal of Nickel tetracarbonyl was demonstrated for 3 days during 9.4 wt % $Ni(CO)_4$ was deposited on the activated carbon used as a sorbent. After initial breakthrough, the content of Nickel tetracarbonyl at the adsorber outlet rose to the inlet level in approximately 20 hours after which removal of Nickel tetracarbonyl from the gas stream could not be observed anymore. At that stage, the total amount of Ni(CO)4 deposited on the activated carbon was 10.5 wt %.
Step II: Regeneration by CO-Containing Gas.

After saturation the $Ni(CO)_4$ addition was shut-off and the adsorber was heated up to 150° C. and subsequently cooled down in the said synthesis gas. Nickel tetracarbonyl e.g. Nickel tetracarbonyl concentrations as high as 60 ppmv at 110° C., at the outlet of the reactor were measured.

Determining the Nickel tetracarbonyl content in the outgoing gas stream in time indicates that the amount desorbed in Step II, the regeneration by CO-containing gas, equals the amount of Nickel tetracarbonyl that is deposited on the absorbent in the preceding adsorption (Step I).

What is claimed is:

1. A process for removal of hydrogen sulphide, iron pentacarbonyl and nickel tetracarbonyl from a feed synthesis gas stream, comprising hydrogen sulphide, iron pentacarbonyl, and nickel tetracarbonyl, the process comprising the steps of:
   (a) removal of hydrogen sulphide and of iron pentacarbonyl from the feed synthesis gas stream by contacting the feed synthesis gas stream with an absorbing liquid comprising water, physical solvent and an amine, to obtain a synthesis gas stream depleted of hydrogen sulphide and depleted of iron pentacarbonyl;
   (b) adsorption of nickel tetracarbonyl by contacting the synthesis gas stream depleted of hydrogen sulphide and depleted of iron pentacarbonyl with a solid adsorbent comprising activated carbon to obtain a solid adsorbent enriched in nickel tetracarbonyl and a purified synthesis gas stream; and
   (c) thereafter desorption of nickel tetracarbonyl by contacting the solid adsorbent enriched in nickel tetracarbonyl with a CO-containing gas comprising at least 0.5 volume % CO to obtain regenerated adsorbent depleted of nickel tetracarbonyl and a CO-containing gas enriched in nickel tetracarbonyl, wherein the temperature at which nickel tetracarbonyl desorption takes place is higher than the temperature at which nickel tetracarbonyl adsorption takes place.

2. A process according to claim 1, wherein the absorbing liquid comprises in the range of from 10 to 45 wt % of water, in the range of from 10 to 40 wt % of physical solvent and in the range of from 20 to 60% amine, all wt % based on total absorbing liquid.

3. A process according to claim 1, wherein the temperature at which nickel tetracarbonyl desorption takes place is in the range of from 5° C. to 175° C. higher than the temperature at which nickel tetracarbonyl adsorption takes place.

4. A process according to claim 3, wherein the CO-containing gas comprises in the range of from 1 to 100 volume % CO based on the total CO-containing gas.

5. A process according to claim 4, wherein nickel tetracarbonyl adsorption is performed at a pressure in the range of from 1 to 80 bara.

6. A process according to claim 5, wherein nickel tetracarbonyl adsorption is performed at a temperature in the range of from 10 to 100° C.

7. A process according to claim 6, wherein the amine comprises one or more compounds selected from the group consisting of monoethanol amine (MEA), diethanolamine (DEA), triethanolamine (TEA), diisopropanolamine (DIPA) and methyldiethanolamine (MDEA).

8. A process according to claim 7, wherein the physical solvent comprises one or more compounds selected from the group consisting of sulfolane, aliphatic acid amides, N-methylpyrrolidone, N-alkylated pyrrolidones and the corresponding piperidones, methanol, ethanol and dialkylethers of polyethylene glycols.

9. A process according to claim 8, wherein step (a) is carried out at a temperature in the range of from 20 to 90° C.

* * * * *